United States Patent
Xu et al.

(10) Patent No.: US 10,536,030 B2
(45) Date of Patent: Jan. 14, 2020

(54) UPS CIRCUIT

(71) Applicant: Eaton Intelligent Power Limited, Dublin (IE)

(72) Inventors: Zhongyong Xu, Shenzhen (CN); David Zheng, Shenzhen (CN); Xizheng Liao, Shenzhen (CN)

(73) Assignee: Eaton Intelligent Power Limited (IE)

( * ) Notice: Subject to any disclaimer, the term of this patent is extended or adjusted under 35 U.S.C. 154(b) by 172 days.

(21) Appl. No.: 15/123,131

(22) PCT Filed: Feb. 28, 2015

(86) PCT No.: PCT/CN2015/073393
§ 371 (c)(1),
(2) Date: Sep. 1, 2016

(87) PCT Pub. No.: WO2015/131781
PCT Pub. Date: Sep. 11, 2015

(65) Prior Publication Data
US 2017/0077749 A1     Mar. 16, 2017

(30) Foreign Application Priority Data
Mar. 4, 2014   (CN) .......................... 2014 1 0076489

(51) Int. Cl.
H02J 3/14       (2006.01)
H02J 9/06       (2006.01)

(52) U.S. Cl.
CPC .............. *H02J 9/062* (2013.01); *H02J 3/14* (2013.01)

(58) Field of Classification Search
CPC ........ H02J 2009/063; H02J 3/14; H02J 9/062; H02J 1/102; H02J 4/00
See application file for complete search history.

(56) References Cited

U.S. PATENT DOCUMENTS 5,343,079 A     8/1994   Mohan et al.
5,923,549 A *   7/1999   Kobayashi ............... H05G 1/54
                                                              363/17

(Continued)

FOREIGN PATENT DOCUMENTS

CN       1848600       10/2006
CN       2859902       1/2007

(Continued)

OTHER PUBLICATIONS

Zhang, et.al., "A Zero-sequence component injected PWM Method with reduced switching Losses and Suppressed Common-Mode Voltage Voltage for a Three-Phase Four-Leg Voltage Source Inverter," Oct. 25-28, 2012, IECON2012-38th Annual Conference on IEEE INdustrial Electronics Society, pp. 5068-5073.*

(Continued)

*Primary Examiner* — Pinping Sun
(74) *Attorney, Agent, or Firm* — Stanek Lemon Crouse & Meeks, P.A.

(57) ABSTRACT

A UPS circuit, comprising a rectification phase leg (PL1) for rectification, which is used for converting a received alternating current into a direct current; inversion phase legs (PL21, PL22, PL23) for inversion, which are used for inverting the direct current output by the rectification phase leg into an alternating current; a failure detection device (D) which is used for detecting whether an inversion phase leg has failed; a redundant inversion phase leg (PL2a), with an input end thereof being connected to an output end of the rectification phase leg; and a control device which is used for receiving a signal sent by the failure detection device and is also used for enabling the redundant inversion phase leg to replace the inversion phase leg which has failed when a failure occurs.

14 Claims, 8 Drawing Sheets

(56) References Cited

U.S. PATENT DOCUMENTS

| | | | | |
|---|---|---|---|---|
| 6,058,031 | A * | 5/2000 | Lyons | H02M 7/487 363/132 |
| 6,275,958 | B1 * | 8/2001 | Carpenter | G01R 31/40 307/82 |
| 6,831,442 | B2 * | 12/2004 | Hsu | H02M 7/5387 318/727 |
| 7,436,686 | B2 * | 10/2008 | Mavier | H02M 7/53875 363/56.01 |
| 7,800,924 | B2 * | 9/2010 | Oughton, Jr. | H02M 5/4585 363/142 |
| 7,920,393 | B2 * | 4/2011 | Bendre | H02M 7/487 363/127 |
| 8,259,480 | B2 * | 9/2012 | Hasler | H02J 3/1857 318/801 |
| 8,471,514 | B2 * | 6/2013 | Zargari | H02J 3/01 318/448 |
| 8,576,987 | B2 * | 11/2013 | Fukuwara | A61B 6/4014 378/101 |
| 9,548,630 | B2 * | 1/2017 | Sato | H02J 9/062 |
| 2005/0162137 | A1 * | 7/2005 | Tracy | H02J 9/062 323/217 |
| 2006/0227579 | A1 * | 10/2006 | Glauser | H02J 9/062 363/71 |
| 2006/0256912 | A1 * | 11/2006 | Katayama | F04D 7/08 376/277 |
| 2008/0054726 | A1 * | 3/2008 | Chang | H02J 7/0068 307/82 |
| 2010/0172166 | A1 * | 7/2010 | Singh | H02M 1/42 363/131 |
| 2012/0313564 | A1 * | 12/2012 | Guitard | H02M 7/48 318/400.21 |
| 2013/0245614 | A1 * | 9/2013 | Seebruch | A61M 1/1086 604/891.1 |
| 2014/0077745 | A1 * | 3/2014 | Kinouchi | H02M 1/32 318/514 |
| 2015/0042166 | A1 * | 2/2015 | Fujita | H02M 5/297 307/63 |
| 2015/0054343 | A1 * | 2/2015 | Cui | H02J 7/02 307/66 |

FOREIGN PATENT DOCUMENTS

| | | |
|---|---|---|
| CN | 101582671 | 11/2009 |
| CN | 102893492 | 1/2013 |
| CN | 103219749 | 7/2013 |
| EP | 1 347 565 A1 | 9/2003 |
| FR | 2954618 | 6/2011 |
| GB | 2355350 | 4/2004 |
| JP | 08-116675 | 5/1996 |
| JP | 2003-259654 | 9/2003 |
| JP | 2007-336750 | 12/2007 |
| JP | 2011-193589 | 9/2011 |

OTHER PUBLICATIONS

Ceballos, et.al., "Fault-Tolerant Neutral-Point-Clamped Converter Solutions Based on Including a Fourth Resonant Leg," Jun. 2011, IEEE Transactions on Industrial Electronics, vol. 58, No. 6, pp. 2293-2303.*

Kumar, "Certain investigations on performance improvement of UPS systems by incorporating ZSI, four wire inverter and cascaded multilevel inverter," available on line Feb. 28, 2014, Anna University, chapter 3, pp. 29-61.*

Extended European Search Report, European Application No. 15758204.0, dated Oct. 25, 2017, 8 pages.

International Search Report Corresponding to International Application No. PCT/CN2015/073393; dated Feb. 28, 2015; 2 Pages.

* cited by examiner

UPS CIRCUIT

RELATED APPLICATIONS

The present application is a 35 U.S.C. § 371 national phase application of PCT International Application No. PCT/CN2015/073393, having an international filing date of Feb. 28, 2015, claiming priority to Chinese Patent Application No. 201410076489.0 filed Mar. 4, 2014. The disclosures of each application are incorporated herein by reference in their entireties. The above PCT International Application was published in the Chinese language as International Publication No. WO 2015/131781.

TECHNICAL FIELD

The present invention relates to a UPS circuit and, more particularly, to a UPS circuit comprising phase legs.

BACKGROUND OF THE INVENTION

A UPS (Uninterruptible Power Supply) is an alternating current power supply with an energy storage device, which provides uninterruptible power to a load using the energy storage device such as a battery during power failures. When the mains power supply is available, the UPS regulates the mains power supply and supplies it to the load. When the mains power supply is not available (power failure), the UPS supplies alternating currents (AC) to the load using the energy storage device, so as to keep the load working normally and protect the software and hardware of the load from damage.

In order to filter the power input, the UPS commonly adopts a structure for AC/DC/AC conversion to provide a pure electric power to the load. Wherein, the AC/DC link converts the AC mains power supply into a smooth DC bus voltage and then provides energy to the next DC/AC link. A conventional AC/DC is realized by uncontrolled rectifier diodes or half controlled SCR and has a low input power factor and a high current harmonics, which will pollute the power grid. A modern AC/DC adopts active semiconductor devices, which can smooth the DC bus voltage and correct the power factor, and thus reduce the pollution to the power grid and ensure a green power grid. A DC/AC link is used to convert the DC bus voltage originating from the AC/DC or the electricity energy storage device into a pure sinusoidal output voltage, so as to ensure the power supply quality and uninterrupted electricity for the load.

FIG. 1 shows a single phase 2 wire UPS circuit with a single phase line L and a single neutral line N, from which the AC/DC/AC conversion process of this UPS circuit is clear. As shown in FIG. 1, the single phase 2 wire UPS circuit comprises a rectification phase leg PL1 for rectification and an inversion phase leg PL2 for inversion. Gate drivers G control the rectification phase leg PL1 and inversion phase leg PL2 corresponding thereto in response to a PWM signal. The AC mains power supply is transmitted from an input end $T_{in}$ to the load of the UPS through a rectification inductor $L_{rec}$, the rectification phase leg PL1, the inversion phase leg PL2, an inversion inductor $L_{inv}$ and an output end $T_{out}$.

FIG. 2 shows a 3 phase 3 wire UPS circuit with three phase lines L1, L2 and L3, which comprises three rectification phase legs PL1 and three inversion phase legs PL2 controlled by the corresponding gate drivers respectively. FIG. 3 shows a 3 phase 4 wire UPS circuit with three phase lines L1, L2, L3 and one neutral line N, the structure of which is similar to that of the 3 phase 3 wire UPS circuit shown in FIG. 2, except for having a further neutral line N.

Reliability and efficiency are two of the most important performances of the UPS. At present, in order to obtain higher efficiency, the inversion phase legs are generally configured into a multi-level conversion topology which requires many semiconductor devices. However, the more the semiconductor devices are, the poorer the reliability is. And thus the reliability of the inversion phase legs decreases. Since the inversion phase legs are common modules of the mains power supply mode and the battery mode, the decrease of the reliability will severely affect the reliability of the whole UPS.

SUMMARY OF INVENTION

In view of the foregoing, an object of the present invention is to provide a UPS circuit which may avoid the drawbacks of the prior art.

A UPS circuit is provided, comprising:
a rectification phase leg for rectification, which is used for converting a received alternating current into a direct current;
an inversion phase leg for inversion, which is used for inverting the direct current output from the rectification phase leg into an alternating current;
a failure detection device, which is used for detecting whether the inversion phase legs fails;
a redundant inversion phase leg, an input end of which is connected to an output end of the rectification phase leg;
a control device, which is used for receiving a signal sent by the failure detection device and also used for replacing a failed inversion phase leg with the redundant inversion phase leg when a failure occurs.

Preferably, the structure of the redundant inversion phase leg is identical to that of the inversion phase leg.

Preferably, the failure detection device comprises a plurality of failure detection modules, each of which is used for detecting a corresponding inversion phase leg.

Preferably, the control device comprises a switching device, which is used for connecting the redundant inversion phase leg to an output end of a phase line corresponding to the failed inversion phase leg, so as to replace the failed inversion phase leg.

Preferably, the switching device comprises one or more switches, when a failure occurs, one of the switches is closed to connect the redundant inversion phase leg to the output end of the phase line corresponding to the failed inversion phase leg, so as to replace the failed inversion phase leg.

Preferably, the UPS circuit is a single phase 2 wire system, a 3 phase 3 wire system or a 3 phase 4 wire system.

Preferably, the single phase 2 wire UPS circuit or 3 phase 4 wire UPS circuit comprises a neutral line, the redundant inversion phase leg is connected to the neutral line for injecting a zero sequence component into the neutral point when no failure occurs in the inversion phase leg.

Preferably, in the single phase 2 wire UPS circuit or 3 phase 4 wire UPS circuit, the redundant inversion phase leg is configured to disconnect from the neutral line if the inversion phase leg fails.

Preferably, in the 3 phase 2 wire UPS circuit, the redundant inversion phase leg acts as a balancer to balance the voltage of a DC bus.

The UPS circuit with the redundant inversion phase leg provided by the present invention can significantly improve the reliability. The reliability of the whole UPS can be ensured even when a multi-level inversion phase leg with more semiconductor devices and a higher failure rate is adopted. Therefore, the efficiency can be improved on the premise of a high reliability.

BRIEF DESCRIPTION OF DRAWINGS

The present invention will be further explained in combination with the embodiments with reference to the accompanying figures, wherein.

DESCRIPTION OF EMBODIMENTS

In the following parts, the present invention will be described in greater details with reference to the embodiments and the accompanying drawings so as to make its objects, solutions and advantages clearer. It should be understood that the specific embodiments described herein only intend to interpret the present invention, without making any limitation thereto.

Figure 1:
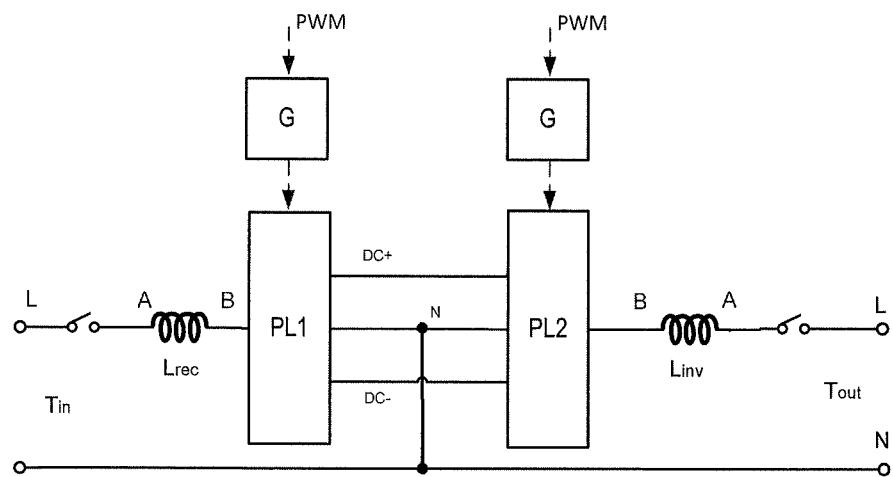
FIG. 1 is a schematic diagram of a prior art single phase 2 wire UPS circuit.
Figure 2:
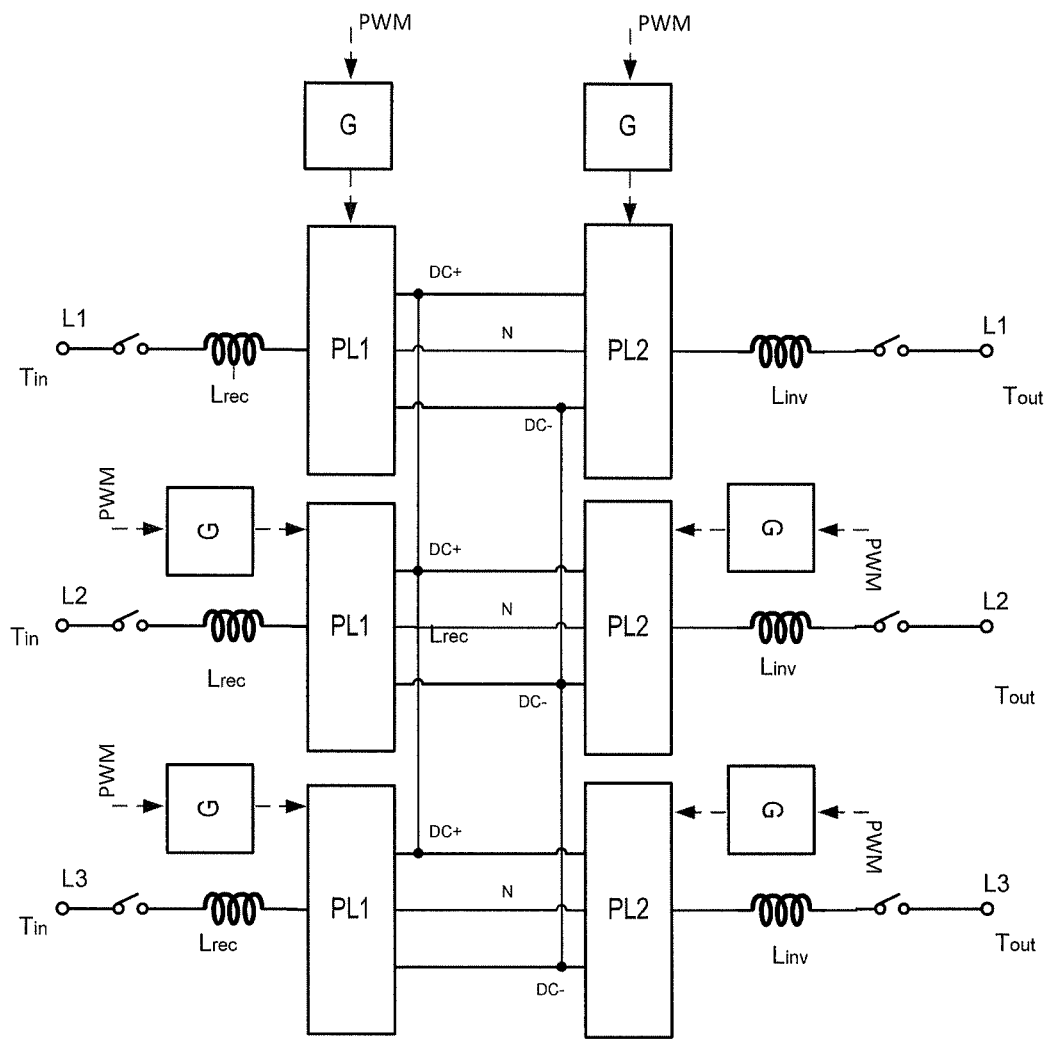
FIG. 2 is a schematic diagram of a prior art 3 phase 3 wire UPS circuit.
Figure 3:
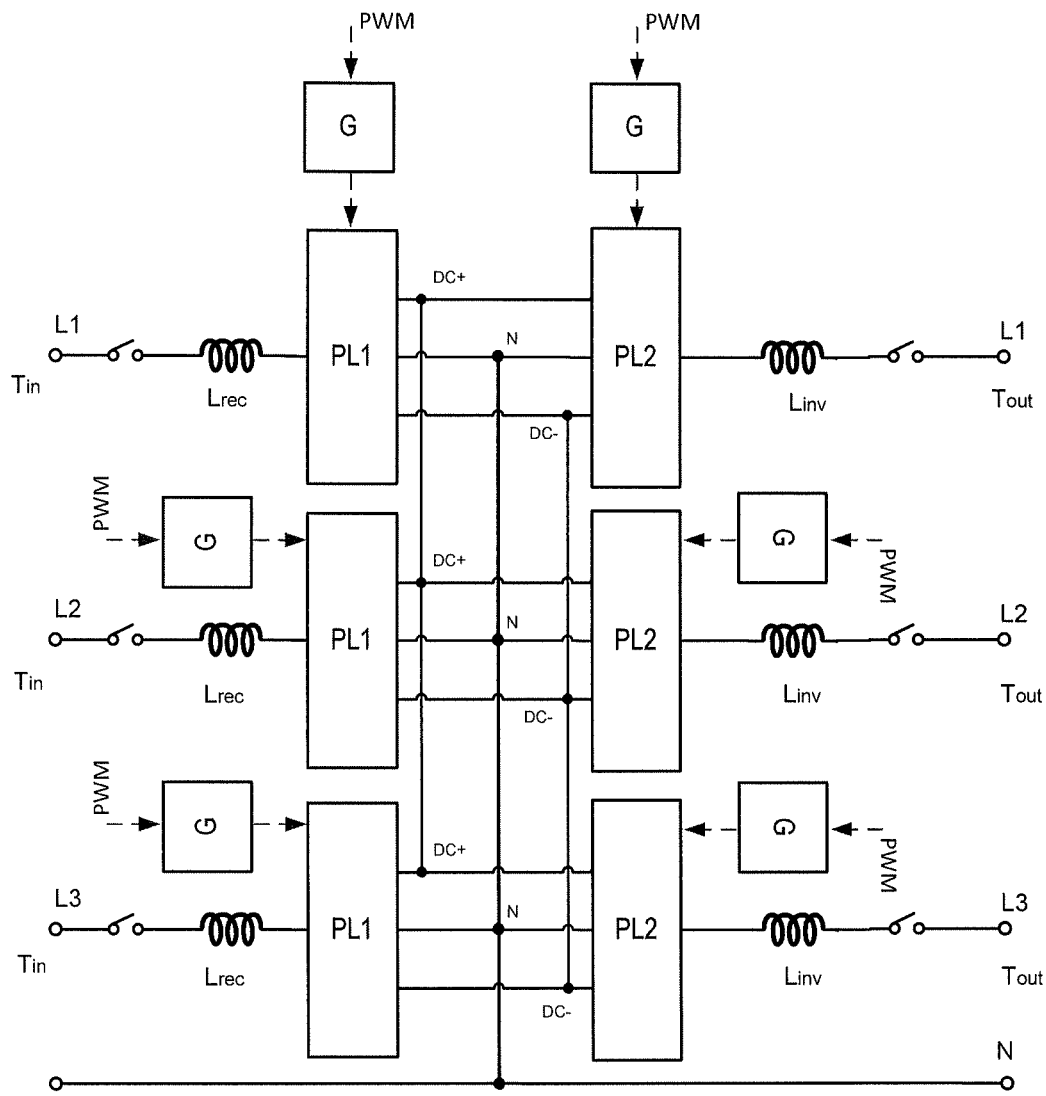
FIG. 3 is a schematic diagram of a prior art 3 phase 4 wire UPS circuit.
Figure 4:
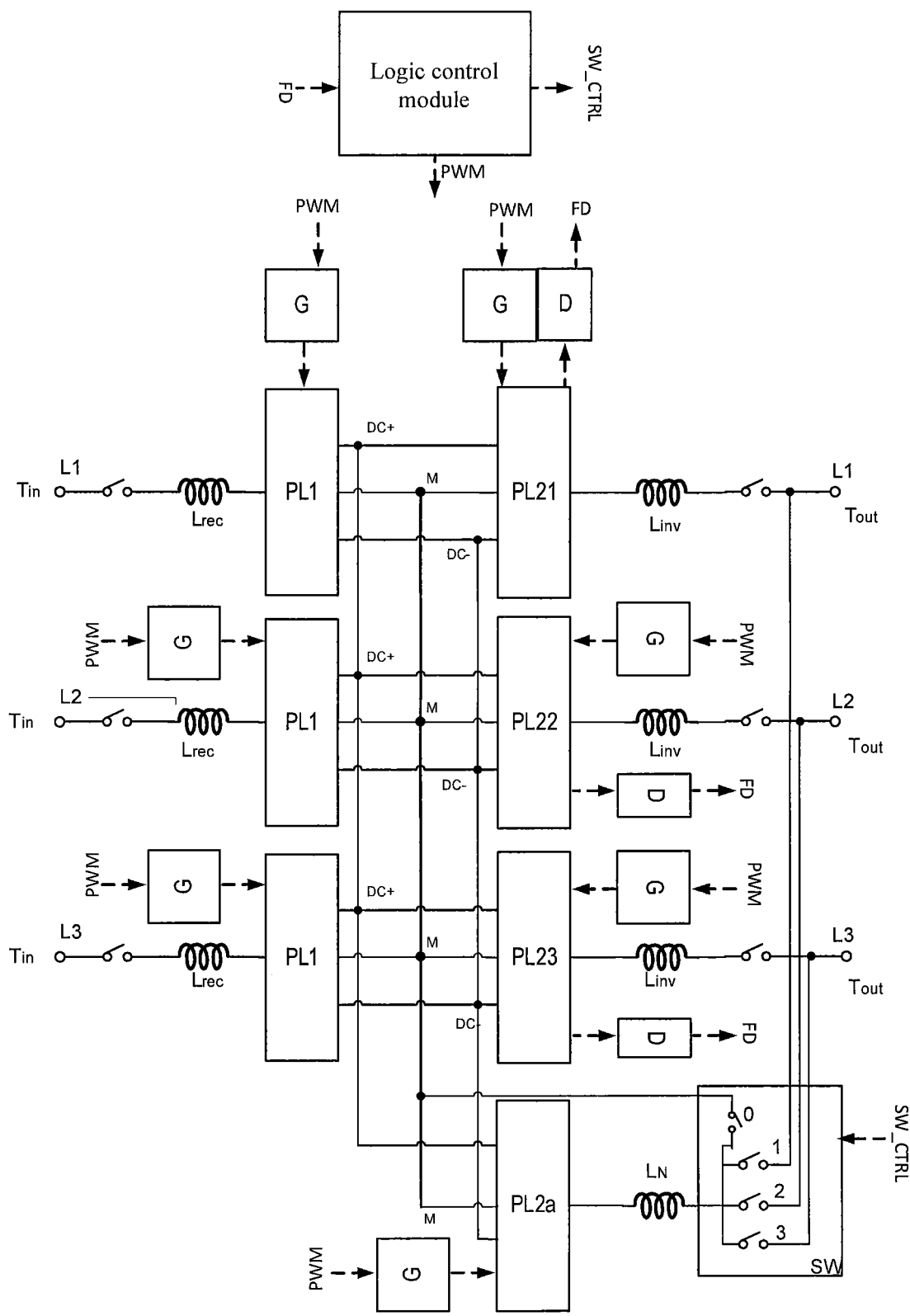
FIG. 4 is a schematic diagram of a 3 phase 3 wire UPS circuit according to one embodiment of the present invention.

The embodiment provides a 3 phase 3 wire UPS circuit with three phase lines L1, L2 and L3, the structure of which is shown in FIG. 4. The UPS circuit comprises three rectification phase legs PL1 for rectification and three inversion phase legs PL21, PL22 and PL23 for inversion. Each gate driver G controls a corresponding phase leg in response to a PWM signal from a logic control module. The AC mains power supply is transmitted from input ends $T_{in}$ of the three phase lines L1, L2 and L3 to the loads of the UPS through rectification inductors $L_{rec}$, the rectification phase legs PL1, the inversion phase legs PL21, PL22 and PL23, inversion inductors $L_{inv}$, and output ends $T_{out}$. In addition, each inversion phase leg has a corresponding failure detection module D. The failure detection modules D are used to detect whether a failure happens in the corresponding phase legs. The failure detection modules D send failure signals FD to the logic control module when a failure is detected.

Moreover, the UPS circuit of the present embodiment further comprises an additional redundant inversion phase leg PL2a, the structure and input connection way of which are the same as those of the inversion phase legs PL21, PL22 and PL23. An output end of the redundant inversion phase leg PL2a is connected to output ends $T_{out}$ of the three phase lines L1, L2 and L3 via an additional redundant inversion inductor $L_N$ and three switches 1, 2 and 3 within a switching device SW. Just like the inversion phase legs PL21, PL22 and PL23, the redundant inversion phase leg PL2a also has a corresponding gate driver G controlled by the PWM signal from the logic control module.

If one of the inversion phase legs fails due to the failure of the semiconductor devices thereof, the failure detection module D corresponding to the failed inversion phase leg sends a failure signal FD to the logic control module upon detecting the failure. The logic control module determines which inversion phase leg fails according to the failure signal FD, stops controlling the gate driver G corresponding to the failed inversion phase leg according to the determination, sends a control signal SW_CTRL to the switching device SW in order to turn on the switch within the switching device SW corresponding to the failed inversion phase leg, and thus replaces the failed inversion phase leg with the redundant inversion phase leg PL2a, so as to ensure the normal operation of the UPS.

For example, if the inversion phase leg PL22 fails, the failure detection module D corresponding to the inversion phase leg PL22 sends a failure signal FD to the logic control module. The logic control module determines that the inversion phase leg PL22 fails according to the failure signal FD, sends a control signal SW_CTRL to the switching device SW to turn on the switch 2 within the switching device SW, and thus makes the output end of the redundant inversion phase leg PL2a connect to the output end of the phase line L2 to replace the failed inversion phase leg PL22.

As shown in FIG. 4, if the inversion phase leg PL21 fails, the logic control module makes the switch 1 within the switching device SW turn on, so as to make the output end of the redundant inversion phase leg PL2a connect to the output end of the phase line L1 to replace the failed inversion phase leg PL21. If the inversion phase leg PL23 fails, the logic control module makes the switch 3 within the switching device SW turn on, so as to make the output end of the redundant inversion phase leg PL2a connect to the output end of the phase line L3 to replace the failed inversion phase leg PL23.

In view of above, the UPS circuit with the redundant inversion phase leg provided by the present embodiment can significantly improve the reliability of the UPS. The reliability of the whole UPS can be ensured even when a multi-level inversion phase leg with more semiconductor devices and a higher failure rate is adopted. Therefore, the efficiency can be improved on the premise of a high reliability.

Figure 5:
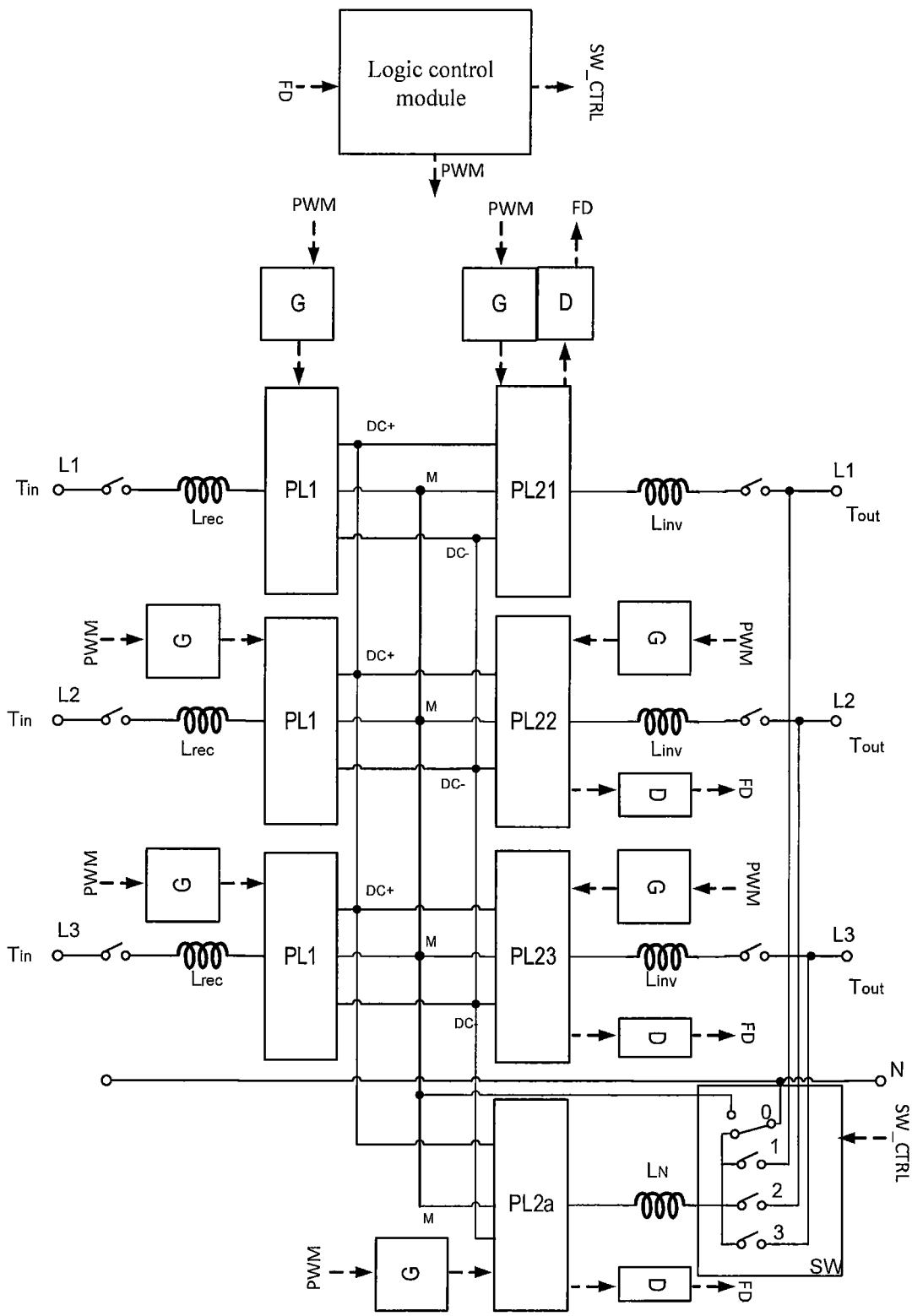
FIG. 5 is a schematic diagram of a 3 phase 4 wire UPS circuit according to one embodiment of the present invention.

According to other embodiments of the present invention, the redundant inversion phase leg of the present invention also can be applied to other types of UPS circuits with inversion phase legs, such as a 3 phase 4 wire UPS circuit. FIG. 5 shows the 3 phase 4 wire UPS circuit with a redundant inversion phase leg PL2a of the present invention, wherein an output end of the redundant inversion phase leg is connected to a neutral line via a redundant inductor and a closed switch 0 within a switching device SW. The redundant inversion phase leg acts for modulation when no failure occurs in inversion phase legs. The 3 phase 4 wire circuit may have unbalanced loads. For example, if just the L1 phase has a load, the L1 phase current can return to a DC bus via a loop consisting of $L_N$ and IGBT in the redundant inversion phase leg. When one of the inversion phase legs fails, by controlling the switching device SW, the failed inversion phase leg is replaced by the redundant inversion phase leg, the switch 0 within the switching device is switched to the other side to make the redundant inversion phase leg disconnect from the neutral line N and make the midpoint M of the DC bus voltage connect to the neutral line N. After the midpoint M of the DC bus voltage is connected to the neutral line N, a loop of the phase current returning to the bus is formed, so as to carry a single phase or three phase unbalanced load. In addition, the phase voltage can use the bus voltage midpoint M as a reference to ensure that an AC is output, i.e., the transient voltage may be positive or negative.

Figure 6:
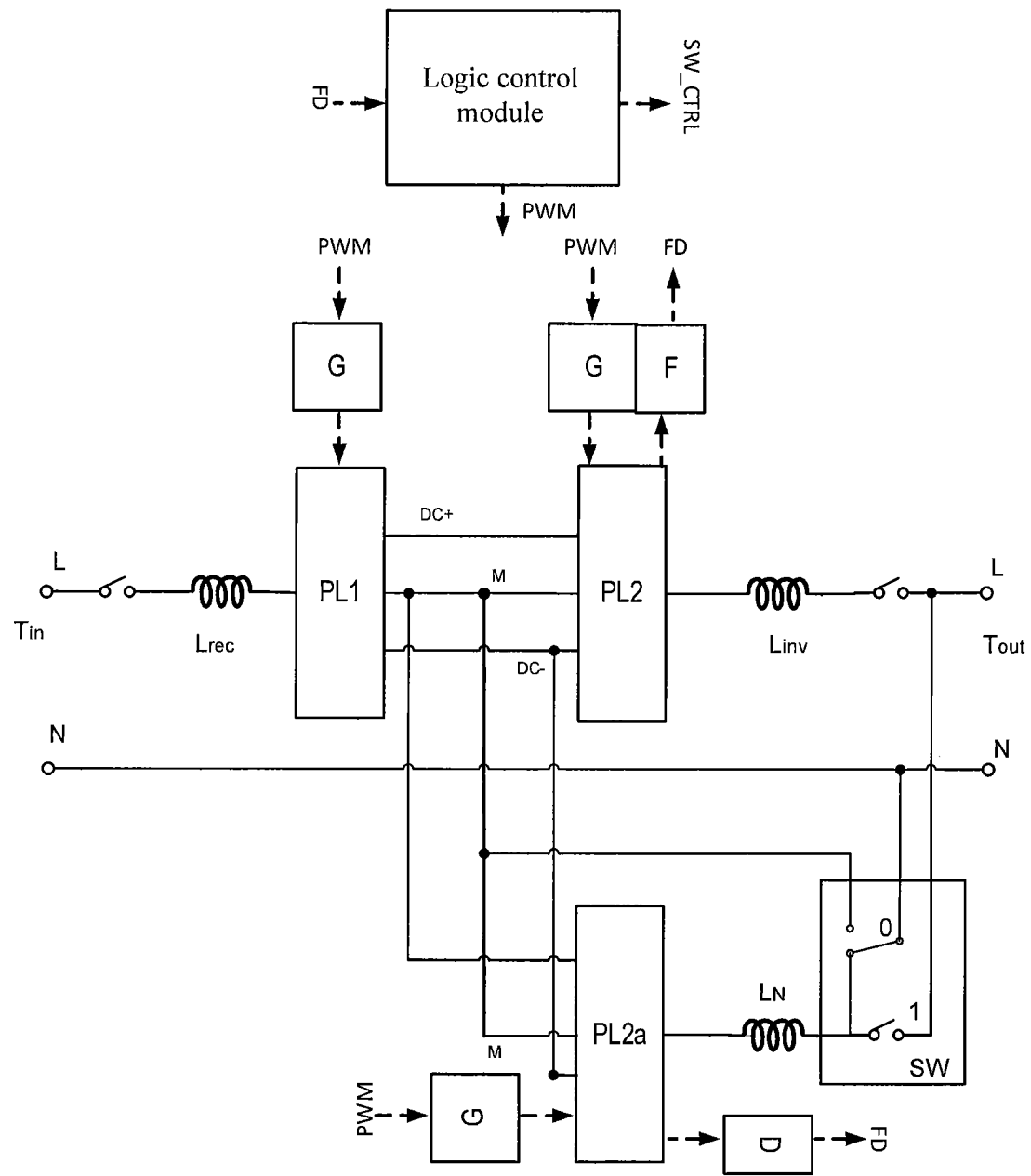
FIG. 6 is a schematic diagram of a single phase 2 wire UPS circuit according to one embodiment of the present invention.

For another example, as shown in FIG. 6, the redundant inversion phase leg can further be applied to the single phase 2 wire UPS circuit. Similar to the 3 phase 4 wire UPS circuit, the output end of the redundant inversion phase leg PL2a is connected to the neutral line via the redundant inversion inductor $L_N$ and the closed switch 0 within the switching device SW. The redundant inversion phase leg acts for modulation if no failure occurs in the inversion phase leg PL2. When the inversion phase leg PL2 fails, the switch 1 is closed by controlling the switching device SW so as to replace the failed inversion phase leg with the redundant inversion phase leg. At the same time, the switch 0 within the switching device is switched to the other side to make the redundant inversion device disconnect from the neutral line N and make the midpoint M of the DC bus voltage connect to the neutral line N.

In the single phase 2 wire or 3 phase 4 wire UPS circuit with a neutral line described above, if no failure occurs in the inversion phase legs, the redundant inversion phase leg is idle and acts for modulation. A zero sequence component is injected into the neutral point to lower the DC bus voltage and the switching times of the semiconductor devices during each mains power supply cycle, so as to further improve the efficiency of the system. For example, by injecting a specific harmonic or a specific choice of SVPWM zero vectors with SPWM, the zero sequence component is injected into the neutral point to lower the DC bus voltage and the switching times of the semiconductor devices during each mains power supply cycle, so as to further improve the efficiency of a 3 phase 4 line system. For injecting a specific harmonic or a specific choice of SVPWM zero vectors with SPWM, reference is made to B. Kaku, et. al, "Switching loss minimized space vector PWM method for IGBT three-level inverter", IEE Proc. Electr. Power Appl., vol. 144, no. 3, pp. 182-190, May 1997.

For a 3 phase 3 wire system, the redundant inversion phase leg may be idle (see FIG. 4), or act as a balancer to balance the DC bus voltage when the UPS desires. When acting as a balancer, the switch 0 is closed when no failure occurs in the inversion phase legs. If the voltage between DC+ and M is higher than that between DC−, and M, the balance between the positive and negative voltages of the DC bus may be realized by storing the excess energy of DC+ in the inductor $L_N$ and feeding the energy back to the DC− by controlling the phase leg PWM, and vice versa. When a failure occurs, the switch 0 is opened, and one of the switches 1, 2 and 3 corresponding to the failed inversion phase leg is closed, so as to replace the failed inversion phase leg with the redundant inversion phase leg.

According to other embodiments of the present invention, the switching device SW is not limited to that described above. The present invention can be realized with any switching device being able to selectively connect the redundant inversion phase leg to the output end of one phase line. In addition, the switching device SW is preferably a semiconductor device. In this case, the redundant inversion phase leg may transiently replace the failed inversion phase leg to achieve continuous AC power from the output end $T_{out}$. However, it will take a little time to close contacts of a mechanical switching device SW, therefore it is impossible to transiently replace the failed inversion phase leg with the redundant inversion phase leg. During the replacing, the AC power does not output from the output end $T_{out}$ for an instant. Therefore, in case of adopting the mechanical switching device SW, if one of the inversion phase legs fails, firstly the UPS is configured to work in a bypass mode (i.e., the rectification phase legs and the inversion phase legs are all bypassed. Now, the output end $T_{out}$ of the UPS is directly powered by the mains power supply.), then the failed inversion phase leg is powered off. Meanwhile, the redundant inversion phase leg is connected to the circuit to replace the failed inversion phase leg by controlling the switching device SW. After completing the replacement, the UPS is switched back to an online mode from the bypass mode, so as to replace the failed inversion phase leg with the redundant inversion phase leg.

In the UPS circuit provided in above embodiments, a corresponding failure detection module D is provided for each inversion phase leg. But this is only for illustration. According to other embodiments of the present invention, other ways can be used to detect which inversion phase leg fails. For example, all the inversion phase legs may be detected by a centralized failure detection device. A person skilled in the art may choose different failure detection methods based on actual demands.

Figure 7A:
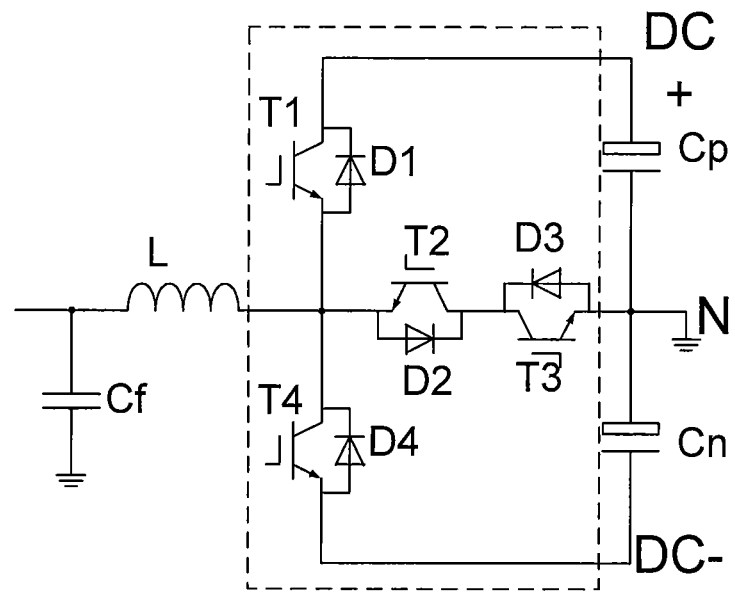
FIGS. 7a-7c show three topologies of the inversion phase legs.
Figure 7B:
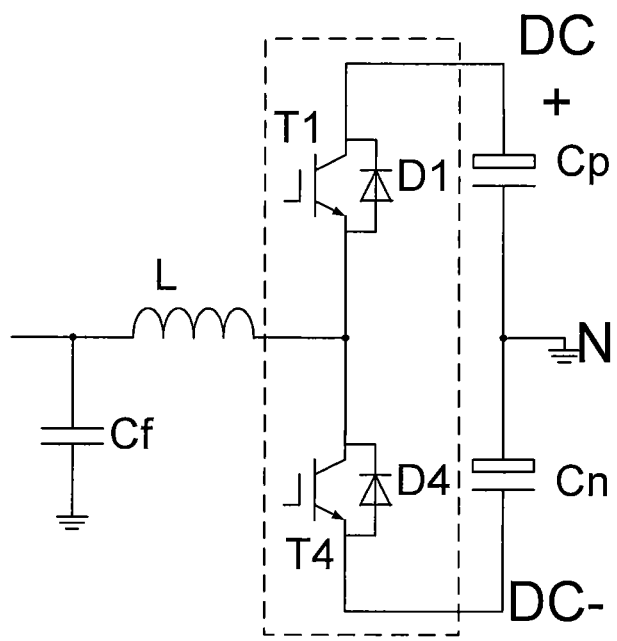
Figure 7C:
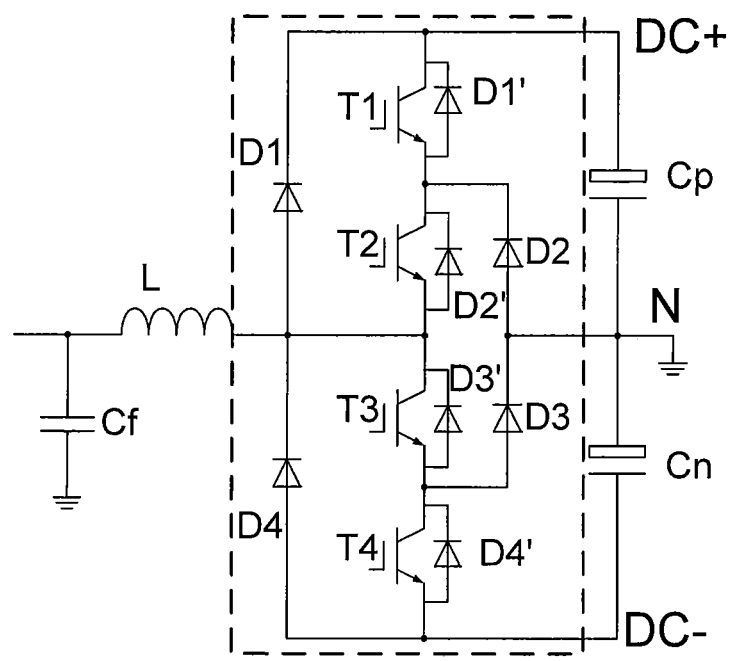

In the UPS circuit of the present invention, each adopted inversion phase leg may consist of discrete semiconductor devices or modules. The inversion phase legs may be configured into double-level conversion topology or multi-level conversion topology to improve the efficiency of the UPS system. For example, FIGS. 7a-7c show three topologies of inversion phase legs, the structures of which are shown in the dashed boxes of FIGS. 7a-7c. Wherein, FIG. 7a shows an inversion phase leg with a T shaped three-level conversion topology. FIG. 7b shows an inversion phase leg with a double-level conversion topology. And FIG. 7c shows an inversion phase leg with a deformed I shaped three-level conversion topology. The above topologies of inversion phase legs are only exemplary. A person skilled in the art may choose various types of topological inversion phase legs based on actual demands.

It should be appreciated that the above embodiments are only used to interpret, not to limit, the solutions of the invention. Embodiments of the present invention have been described in terms of the preferred embodiments, but the present invention is not limited to the embodiments described above, and various amendments and changes may be made within the scope of the present invention.

The invention claimed is:

1. An uninterruptible power supply (UPS) circuit, comprising:
    a rectification phase leg;
    a plurality of first inductors;
    a plurality of first inversion phase legs configured to be connected to a load via respective ones of the first inductors in first inverter configuration;
    a neutral line;
    a control circuit configured to detect a status of respective ones of the first inversion phase legs;
    a second inductor; and
    a second inversion phase leg, an input end of which is connected to an output end of the rectification phase leg and an output end of which is coupled to the second inductor,
    wherein the control circuit is configured to connect the second inversion phase leg to a neutral line via the second inductor for an injection of a zero sequence component into the neutral line when the plurality of first inversion phase legs are configured in the first inverter configuration and to switch the second inversion phase leg and the second inductor from the neutral line to the load to replace a selected one of the first inversion phase legs and a selected one of the first inductors with the second inversion phase leg and the second inductor, respectively, responsive to a failure of the selected one of the first inversion phase legs to form a second inverter configuration that has the same number of phases as the first inverter configuration.

2. The UPS circuit according to claim 1, wherein the structure of the second inversion phase leg is identical to that of the first inversion, phase legs.

3. The UPS circuit according to claim 1, wherein the control circuit comprises a switching device configured to connect the second inversion phase leg and the second inductor to an output end of a phase line corresponding to the selected first inversion phase leg and the selected first inductor, so as to replace the selected first inversion phase leg and the selected first inductor.

4. The UPS circuit according to claim 3, wherein the switching device comprises one or more switches, and when the failure of the selected one of the first inversion phase legs occurs, one of the switches is closed to connect the second inversion phase leg and the second inductor to the output end of the phase line corresponding to the selected first inversion phase leg and the selected first inductor, so as to replace the selected first inversion phase leg and the selected first inductor.

5. The UPS circuit according to claim 1, wherein the UPS circuit is a 3 phase 3 wire system.

6. The UPS circuit according to claim 5, wherein the second inversion phase leg and the second inductor act as a balancer to balance a voltage of a DC bus when the plurality of first inversion phase legs are connected in the first inverter configuration.

7. The UPS circuit according to claim 1, wherein the UPS circuit is a single phase 2 wire system or a 3 phase 4 wire system.

8. An uninterruptible power supply (UPS) comprising:
a multi-phase power converter circuit having a plurality of first inversion phase legs configured to be coupled to a source or load via respective first inductors and a redundant second inversion phase leg and a second inductor; and
a control circuit configured to collectively operate first and second ones of the first inversion phase legs and first and second ones of the first inductors to perform power conversion in a first power converter configuration and to deactivate and replace a failed first one of the first inversion phase legs and the first one of the first inductors with the second inversion phase leg and the second inductor such that the second inversion phase leg, the second one of the first inductors, the second one of the first inversion phase legs, and the second inductor operate collectively to perform power conversion in a second power converter configuration having the same number of phases as the first power converter configuration, wherein the control circuit comprises a switching circuit configured to connect the second inversion phase leg and the second inductor to a neutral line to support an injection of a zero sequence component when the plurality of first inversion phase legs and the first inductors are connected in the first power converter configuration and to connect the second inversion phase leg and the second inductor to an output end of a phase line corresponding to the failed of the first one of the first inversion phase legs and the first one of the first inductors when the power converter circuit is in the second power converter configuration.

9. The UPS of claim 8, wherein the control circuit is configured to detect a status of the first inversion phase legs and to replace the first one of the first inversion phase legs and the first one of the first inductors with the second inversion phase leg and the second inductor responsive to the detected status.

10. The UPS of claim 9, wherein the detected status comprises a failure of the one of the first inversion phase legs.

11. The UPS of claim 9, wherein the first inversion phase legs and the second inversion phase leg are identical.

12. The UPS of claim 9, wherein the control circuit is configured to detect status of respective ones of the plurality of first inversion phase legs.

13. The UPS of claim 8, wherein the second inversion phase leg and the second inductor are configured to act as a balancer to balance a voltage of a DC bus first when the first inversion phase legs are connected in the first power converter configuration.

14. An uninterruptible power supply (UPS) comprising:
a multi-phase converter comprising a plurality of first phase legs configured to be coupled to a source or a load via respective first inductors, a second phase leg, and a second inductor; and
a control circuit configured to switch the second phase leg and the second inductor to couple a DC bus to a neutral line for an injection of a zero sequence component into the neutral line in a first mode and to disconnect the second phase leg and the second inductor from the neutral line and switch the second phase leg and the second inductor to the source or the load to replace a failed one of the first phase legs and associated one of the first inductors in a second mode.

* * * * *